(12) United States Patent
Wang et al.

(10) Patent No.: US 11,906,352 B2
(45) Date of Patent: Feb. 20, 2024

(54) ALL-OPTICAL DETECTOR AND DETECTION SYSTEM, RESPONSE TIME TEST SYSTEM, AND MANUFACTURING METHOD HAVING A MICRO-NANOFIBER COMPRISING AN OPTICAL RESONANT CAVITY ARRANGED IN A UNIFORMITY ZONE OF THE MICRO-NANOFIBER

(71) Applicant: SHENZHEN UNIVERSITY, Guangdong (CN)

(72) Inventors: Ying Wang, Shenzhen (CN); Yiping Wang, Shenzhen (CN); Longfei Zhang, Shenzhen (CN); Changrui Liao, Shenzhen (CN)

(73) Assignee: Shenzhen University, Shenzhen (CN)

( * ) Notice: Subject to any disclaimer, the term of this patent is extended or adjusted under 35 U.S.C. 154(b) by 269 days.

(21) Appl. No.: 17/294,080

(22) PCT Filed: Nov. 16, 2018

(86) PCT No.: PCT/CN2018/115784
§ 371 (c)(1),
(2) Date: Jun. 2, 2021

(87) PCT Pub. No.: WO2020/097898
PCT Pub. Date: May 22, 2020

(65) Prior Publication Data
US 2022/0011156 A1    Jan. 13, 2022

(51) Int. Cl.
*G01J 1/04*    (2006.01)
(52) U.S. Cl.
CPC ............. *G01J 1/047* (2013.01); *G01J 1/0425* (2013.01)

(58) Field of Classification Search
CPC ........... G01J 1/047; G01J 1/0425; G01J 1/429
(Continued)

(56) References Cited

U.S. PATENT DOCUMENTS

| 6,741,628 B2 * | 5/2004 | Painter ..................... H01S 5/10 372/64 |
| 2007/0114364 A1 | 5/2007 | Fan et al. |
| 2017/0114364 A9 | 4/2017 | Allison et al. |

FOREIGN PATENT DOCUMENTS

| CN | 101714742 A | 5/2010 |
| CN | 103091831 A | 5/2013 |
| CN | 106847987 A | 6/2017 |

OTHER PUBLICATIONS

International Search Report dated Jul. 31, 2019 issued in corresponding Patent Application No. PCT/CN2018/115784 (4 pages).

* cited by examiner

*Primary Examiner* — Que Tan Le
*Assistant Examiner* — Mai Thi Ngoc Tran
(74) *Attorney, Agent, or Firm* — Polsinelli PC

(57) ABSTRACT

The present application relates to an all-optical detector and detection system, a response time test system, and a manufacturing method. The all-optical detector comprises a micro-nanofiber and an optical resonant cavity. The micro-nanofiber comprises transition regions and a uniform region. The uniform region is connected to the transition regions. The optical resonant cavity is provided in the uniform region. The optical resonant cavity is made of a semiconductor material. The all-optical detector provided in the present application detects light by means of the change of a resonance peak, achieves all-optical detection, and has a high signal-to-noise ratio.

20 Claims, 5 Drawing Sheets

(58) Field of Classification Search
USPC .................................... 250/227.28, 227.11
See application file for complete search history.

ALL-OPTICAL DETECTOR AND DETECTION SYSTEM, RESPONSE TIME TEST SYSTEM, AND MANUFACTURING METHOD HAVING A MICRO-NANOFIBER COMPRISING AN OPTICAL RESONANT CAVITY ARRANGED IN A UNIFORMITY ZONE OF THE MICRO-NANOFIBER

CROSS-REFERENCE OF THE RELATED APPLICATIONS

This application is a National Phase of International Application No. PCT/CN2018/115784 filed on Nov. 16, 2018, entitled "ALL-OPTICAL DETECTOR AND DETECTION SYSTEM, RESPONSE TIME TEST SYSTEM, AND MANUFACTURING METHOD", the contents of which are expressly incorporated by reference herein in its entirety.

TECHNICAL FIELD

The present disclosure relates to the field of photodetectors, more particularly, to an all-optical detector, a detection system, a response time test system and a manufacturing method thereof.

BACKGROUND

With the development of science and technology, photodetectors have gradually been widely used in various fields of military and national economy. For example, ultraviolet detectors have important applications in fields such as medical diagnosis, space technologies, missile guidance, weather forecast and environmental monitoring. For example, in the field of medical diagnosis, the ultraviolet detectors can be used for skin disease diagnosis; that is, the ultraviolet detectors observe skin lesions and examine pathological cells by using an ultraviolet detection technology. In another example, in the field of military, the ultraviolet detectors play an important role in aspects such as missile early warning and tracking, with the principle of identifying a position of a missile by detecting ultraviolet radiation in a missile plume, thereby enabling weapons and equipment on the ground to determine a target and give early warning.

A photodetector in the conventional technology is mainly divided into a vacuum device and a solid-state detector. The vacuum device is mainly a photomultiplier tube device sensitive to light. The solid-state detector is mainly represented by a silicon photodiode. The vacuum device has disadvantages such as a large volume and a high operating voltage. The solid-state detector is required to be provided with an optical color filter due to a small band gap and response to visible light. Therefore, sensitivity of the solid-state detector is limited by transmittance of the color filter and photocathode quantum efficiency. Moreover, the solid-state detector is large and heavy and has a high operating voltage and low photocathode quantum efficiency.

Based on the above problems, wide band-gap semiconductor materials with very little response to visible light have become preferred materials for new-generation photodetectors. Due to the advantages such as a small size, a wide spectral response range, high quantum efficiency, a wide dynamic operating range and low background noise, wide band-gap semiconductor photodetectors occupy an increasingly larger share in the market of the ultraviolet detectors. However, photodetectors made of the wide band-gap semiconductor materials in the prior art still have a high signal-to-noise ratio.

SUMMARY

In view of the above, the present disclosure discloses an all-optical detector, a detection system, a response time test system and a manufacturing method thereof.

An all-optical detector includes:

a micro-nanofiber including a transition zone and a uniformity zone, the uniformity zone being connected to the transition zone;

an optical resonant cavity arranged in the uniformity zone, the optical resonant cavity being made of a semiconductor material.

The all-optical detector according to embodiments of the present disclosure includes a micro-nanofiber and an optical resonant cavity. The optical resonant cavity is made of a semiconductor material. The micro-nanofiber and the optical resonant cavity form a WGM micro-nano composite structure, and the light entered by the micro-nanofiber can produce resonance in the optical resonant cavity. The optical resonant cavity can absorb light and make its refractive index change, so that a resonance peak changes, thereby realizing optical detection. Firstly, the all-optical detector according to the embodiments of the present application detects light through changes in the resonance peak to realize all-optical detection, without converting optical signals into electrical signals for detection, so it is less affected by environmental factors and has a high signal-to-noise ratio. Secondly, the all-optical detector according to the embodiments of the present application realizes optical detection by changing the refractive index of the optical resonant cavity with light. Compared with photoelectric detection in the conventional technology, the conversion of the optical signals and the electrical signals is not necessary, so the response time is fast. Thirdly, the all-optical detector according to the embodiments of the present application realizes optical detection based on the micro-nanofiber, so that the optical resonant cavity is easy to be coupled with a single-mode fiber, thereby greatly reducing the connection loss. Fourthly, the all-optical detector according to the embodiments of the present application is simple in structure and easy to implement.

An all-optical detection system includes:

any one of the all-optical detectors described above;

a light source connected to a first end of the micro-nanofiber and configured to input a light to the all-optical detector; and a spectrometer connected to a second end of the micro-nanofiber and configured to receive an output light of the all-optical detector and monitor a drift amount of a resonance peak of the output light.

The all-optical detection system according to this embodiment includes the all-optical detector. Firstly, the all-optical detector detects light through changes in a resonance peak to realize all-optical detection, without converting optical signals into electrical signals for detection, so it is less affected by environmental factors and has a high signal-to-noise ratio. Therefore, the all-optical detection system has a high signal-to-noise ratio. Secondly, the all-optical detector realizes optical detection by changing the refractive index of the optical resonant cavity with light. The all-optical detector does not require the conversion of the optical signals and the electrical signals, and thus has a fast response time. Therefore, the all-optical detection system has a fast response time. Thirdly, the all-optical detector of the all-optical detection system realizes optical detection based on the micro-nanofiber, so that the optical resonant cavity is easy to be coupled with a single-mode fiber, thereby greatly reducing the connection loss. Fourthly, the all-optical detection system according to the embodiments of the present application is simple in structure and easy to implement.

An all-optical detector response time test system, for testing a response time of any one of the all-optical detectors described above, includes:

a light source connected to a first end of the micro-nanofiber and configured to input a signal light to the all-optical detector;

a test light source configured to output a test light irradiated on the optical resonant cavity;

an optical chopper arranged between the test light source and the optical resonant cavity and configured to modulate the test light and output a pulse test light; and a photoelectric detector with an input terminal connected to a second end of the micro-nanofiber and configured to receive a light outputted by the optical resonant cavity and convert an optical signal into an electrical signal.

In the all-optical detector response time test system according to the embodiments of the present disclosure, the conversion of the optical signal is represented by the electrical signal through the signal light source, the test light source, the optical chopper and the photoelectric detector, so as to simply and intuitively test the response time of the all-optical detector. Appearance and disappearance of to-be-detected light are simulated by the test light source and the optical chopper, so that the test efficiency is high, simple and reliable.

A manufacturing method of an all-optical detector includes:

preparing a micro-nanofiber including a transition zone and a uniformity zone, the uniformity zone being connected to the transition zone;

acquiring an optical resonant cavity made of a one-dimensional semiconductor material; and adsorbing the optical resonant cavity to the uniformity zone.

In the method according to the embodiments of the present disclosure, cladding of a section with a preset length is removed from a single-mode fiber to obtain a first fiber including a bare section, the bare section is heated with an oxyhydrogen flame to make the bare section in a molten state, and cyclic tapering operations are carried out on two ends of the first fiber to reduce a diameter of the bare section in the molten state to 1 μm to 3 μm, so as to obtain the micro-nanofiber. The micro-nanofiber prepared with the method according to the embodiments of the present application is simple, feasible, highly reproducible and controllable.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description are some embodiments of the present disclosure, and those of ordinary skill in the art may still derive other drawings from these accompanying drawings without creative efforts.

DESCRIPTION OF REFERENCE NUMERALS

Figure 1:
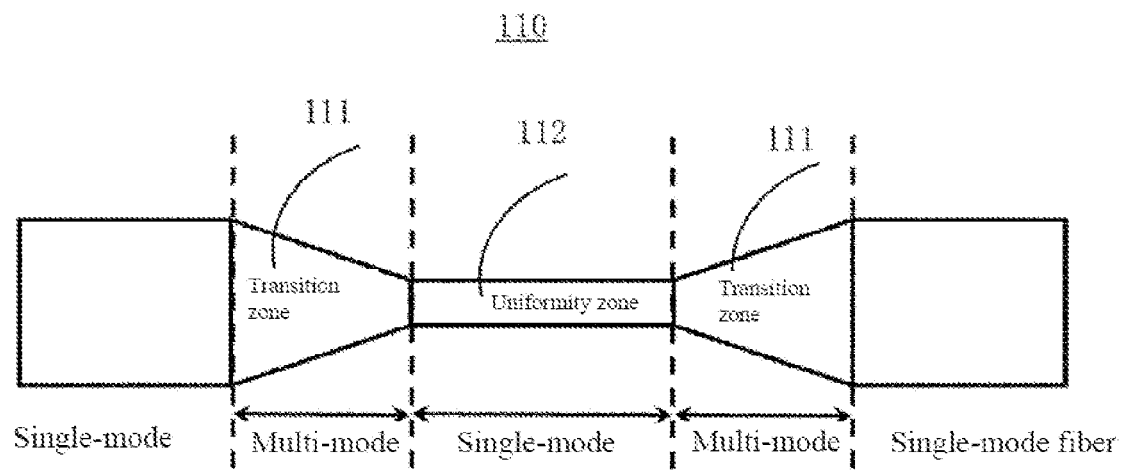
FIG. 1 is a schematic structural diagram of a micro-nanofiber according to an embodiment of the present disclosure.

All-optical detector 100
Micro-nanofiber 110
Transition zone 111
Uniformity zone 112
Optical resonant cavity 120
All-optical detector response time test system 200
Signal light source 210
Test light source 220
Optical chopper 230
Photoelectric detector 240
Oscilloscope 250
Focus lens 260
Reflector 270
Support frame 280
All-optical detection system 300
Light source 310
Spectrometer 320

DETAILED DESCRIPTION OF THE EMBODIMENTS

In order to make the objectives, technical solutions and advantages of the present disclosure more clearly understood, the present disclosure is described in further detail below through embodiments in conjunction with the accompanying drawings. It should be understood that particular embodiments described herein are intended only to interpret the present disclosure and not intended to limit the present disclosure.

The serial numbers for components herein, such as "the first" and "the second", are used only to distinguish the described objects, and do not have any sequential or technical meaning. As used in the present disclosure, "connect" or "couple", unless otherwise specified, includes both direct and indirect connections (coupling). In the description of the present disclosure, it should be understood that the orientation or position relationship indicated by the terms "upper", "lower", "front", "back", "left", "right", "vertical", "horizontal", "top", "bottom", "inner", "outer", "clockwise", "counterclockwise", etc. are based on the orientation or position relationship shown in the accompanying drawings and are intended to facilitate the description of the present disclosure and simplify the description only, rather than indicating or implying that the device or element referred to must have a particular orientation or be constructed and operated in a particular orientation, and therefore will not to be interpreted as limiting the present disclosure.

In the present disclosure, unless otherwise explicitly specified and defined, the expression a first feature being "on" or "under" a second feature may be the case that the first feature is in direct contact with the second feature, or the first feature is in indirect contact with the second feature via an intermediate medium. Furthermore, the expression the first feature being "over", "above" and "on top of" the second feature may be the case that the first feature is directly above or obliquely above the second feature, or only means that the level of the first feature is higher than that of the second feature. The expression the first feature being "underneath", "below" and "beneath" the second feature may be the case that the first feature is directly below or obliquely below the second feature, or only means that the level of the first feature is less than that of the second feature.

Figure 2:
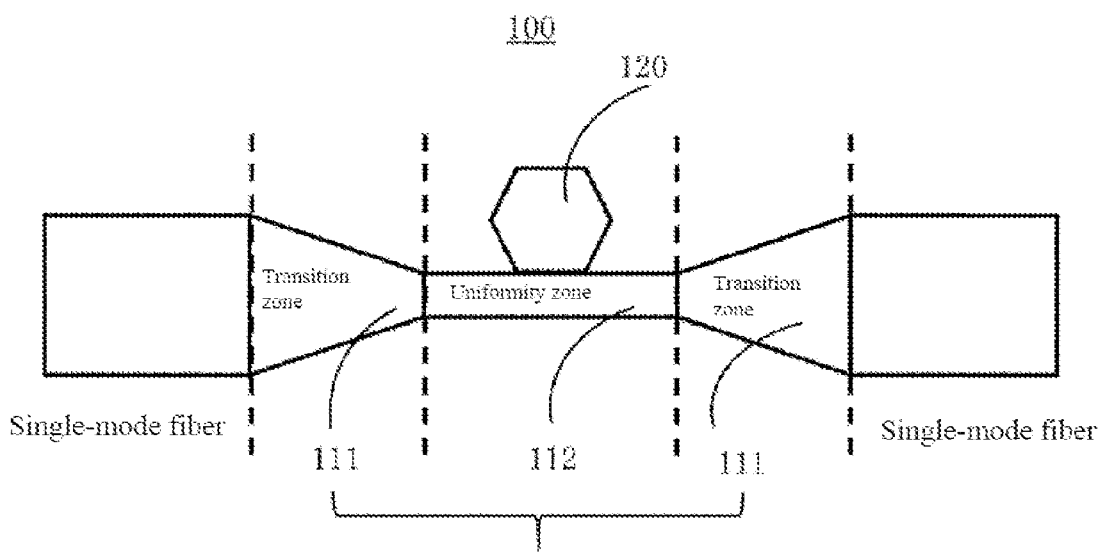
FIG. 2 is a schematic structural diagram of an all-optical detector according to an embodiment of the present disclosure.

Referring to FIG. 1 and FIG. 2, an all-optical detector 100 according to an embodiment of the present disclosure includes a micro-nanofiber 110 and an optical resonant cavity 120. The micro-nanofiber 110 includes a transition zone 111 and a uniformity zone 112. The uniformity zone 112 is connected to the transition zone 111. The optical resonant cavity 120 is arranged in the uniformity zone 112. The optical resonant cavity 120 is made of a semiconductor material.

Both the transition zone 111 and the uniformity zone 112 may be generated by stretching and melting a single-mode fiber. The transition zone 111 is tapered, also known as a tapered zone. Two ends of the uniformity zone 112 are connected to the transition zone 111, also known as a beam waist zone or a waist zone. The micro-nanofiber 110 is configured to propagate an optical signal.

The optical resonant cavity 120 is a cavity structure that can guide light and realize resonance. The optical resonant cavity 120 is made of a semiconductor material. The optical resonant cavity 120 has a wide band gap and can absorb light energy intrinsically. The optical resonant cavity 120 made of a different material can absorb different light. The specific material of the optical resonant cavity 120 is not limited in the present application, and may be selected according to an actual requirement. The optical resonant cavity 120 may be of either a cylindrical structure or a polygonal cube structure. The optical resonant cavity 120 is arranged in the uniformity zone 112. An extension direction of the optical resonant cavity 120 may be at an angle to an extension direction of the uniformity zone 112. How the optical resonant cavity 120 is combined with the uniformity zone 112 is not limited in the present disclosure, which may be selected according to an actual requirement. The optical resonant cavity 120 is arranged in the uniformity zone 112, so that the optical resonant cavity 120 is coupled with the micro-nanofiber 110 to form a whispering gallery mode (WGM) micro-nano composition structure.

Figure 3:
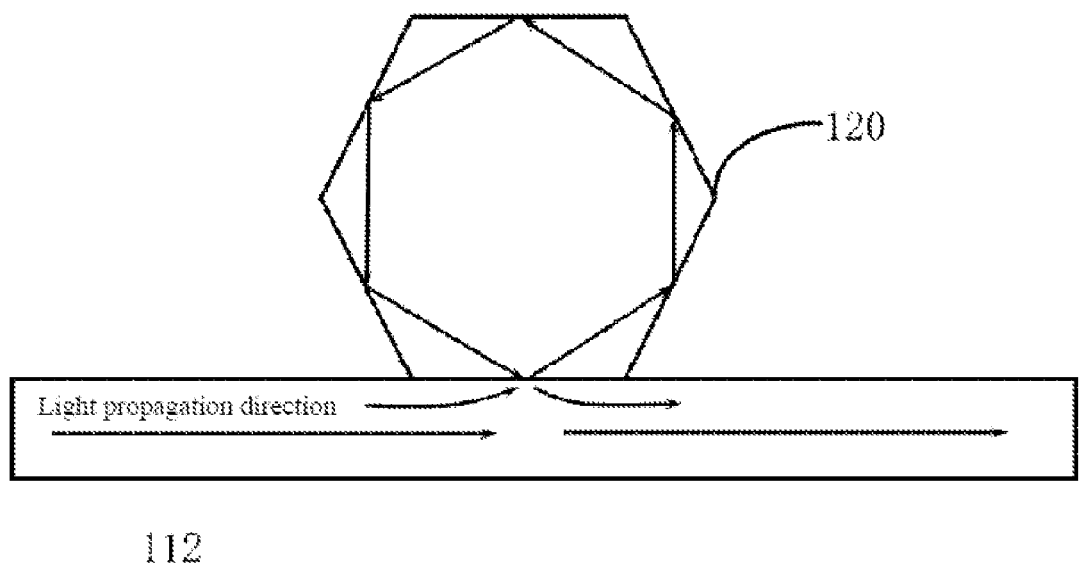
FIG. 3 is a schematic diagram of the coupling principle of the all-optical detector according to an embodiment of the present disclosure.

Referring to FIG. 3, FIG. 3 is a schematic diagram of the coupling principle of light when the extension direction of the optical resonant cavity 120 is perpendicular to that of the uniformity zone 112. The working principle of the all-optical detector 100 is as follows. An optical signal is inputted at the micro-nanofiber 110. The optical signal is propagated to the uniformity zone 112 along the transition zone 111 of the micro-nanofiber 110. The optical signal includes light with a variety of wavelengths. The light satisfying a resonance condition in the optical signal enters the optical resonant cavity 120 and resonates between the micro-nanofiber 110 and the optical resonant cavity 120, so as to form a resonance peak. The resonance condition means that an optical path difference of the light in the optical resonant cavity 120 for a round trip is an integer multiple of an optical wavelength. The all-optical detector 100 is placed in a to-be-detected environment. When to-be-detected light appears in the to-be-detected environment, the optical resonant cavity 120 made of the semiconductor material absorbs the to-be-detected light, so that a refractive index of the optical resonant cavity 120 is changed, an optical path of the light propagated in the optical resonant cavity 120 is changed, and a resonance peak of the light is changed accordingly. Optical detection can be achieved by detecting a drift amount of the resonance peak. Specifically, when the resonance peak drifts, it indicates that to-be-detected light exists in the to-be-detected environment. The greater the offset of the resonance peak, the stronger the light intensity of the to-be-detected light.

Figure 4:
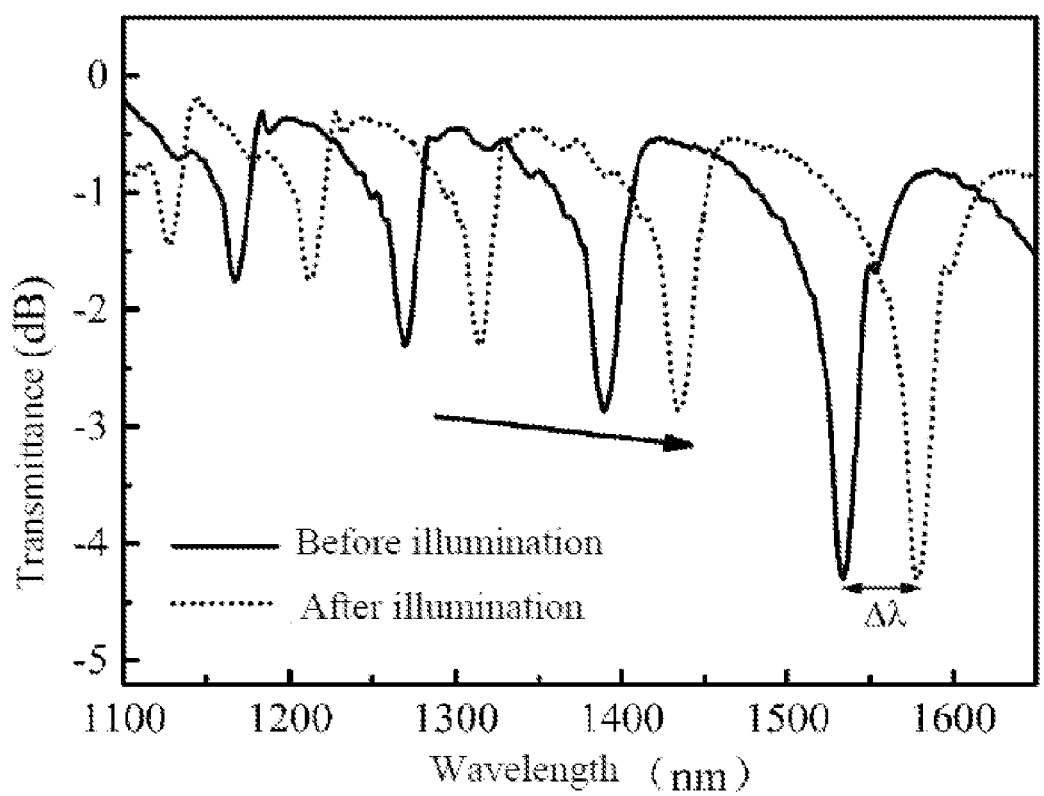
FIG. 4 is a schematic diagram of the principle of the all-optical detector according to an embodiment of the present disclosure.

Referring to FIG. 4, FIG. 4 shows wavelengths before and after the to-be-detected light illuminates the all-optical detector. Before the to-be-detected light illuminates the optical resonant cavity 120, a resonance peak of a resonant wave is a first resonance peak. The first resonance peak represents a resonant wavelength before the to-be-detected light illuminates the optical resonant cavity 120. When the to-be-detected light is irradiated on a surface of the optical resonant cavity 120, the refractive index of the optical resonant cavity 120 is changed by the to-be-detected light, so that an optical path of the light propagated in the optical resonant cavity 120 also changed, and then the position of the resonance peak is changed. In this case, the resonance peak is defined as a second resonance peak. The second resonance peak represents a resonant wavelength after the to-be-detected light illuminates the optical resonant cavity 120. A drift amount of the resonance peak can be obtained according to resonant wavelengths corresponding to positions of the first resonance peak and the second resonance peak, so as to obtain a condition of the to-be-detected light.

In this embodiment, the all-optical detector 100 includes a micro-nanofiber 110 and an optical resonant cavity 120. The optical resonant cavity 120 is made of a semiconductor material. The micro-nanofiber 110 and the optical resonant cavity 120 form a WGM micro-nano composite structure, and light entered by the micro-nanofiber 110 can produce resonance in the optical resonant cavity 120. The optical resonant cavity 120 can absorb light and make its refractive index change, so that a resonance peak changes, thereby realizing optical detection. Firstly, the all-optical detector 100 according to this embodiment detects light through changes in the resonance peak to realize all-optical detection, without converting optical signals into electrical signals for detection, so it is less affected by environmental factors and has a high signal-to-noise ratio. Secondly, the all-optical detector 100 according to this embodiment realizes optical detection by changing the refractive index of the optical resonant cavity 120 with light. Compared with photoelectric detection in the conventional technology, the conversion of the optical signals and the electrical signals is not necessary, so the response time is fast. Thirdly, the all-optical detector 100 according to this embodiment realizes optical detection based on the micro-nanofiber 110, so that the optical resonant cavity 120 is easy to be coupled with a single-mode fiber, thereby greatly reducing the connection loss. Fourthly, the all-optical detector 100 according to the embodiment of the present application is simple in structure and easy to implement.

In one embodiment, the optical resonant cavity 120 is made of a one-dimensional semiconductor material. For example, the optical resonant cavity 120 may be made of materials such as CdS, AlN and ZnO. Compared with a conventional ring resonant cavity, the optical resonant cavity 120 made of the one-dimensional semiconductor material can improve the stability of the all-optical detector 100.

In one embodiment, the optical resonant cavity 120 is of a ZnO micron-wire structure. The optical resonant cavity 120 is of a micron-wire structure made of a ZnO material. The optical resonant cavity 120 with the ZnO micron-wire structure can absorb ultraviolet light and detect ultraviolet light.

In one embodiment, the ZnO micron-wire has a diameter ranging from 3 μm to 15 μm. That is, the optical resonant cavity 120 has a diameter ranging from 3 μm to 15 μm.

In one embodiment, the uniformity zone 112 has a diameter ranging from 1 μm to 3 μm. The micro-nanofiber 110, in which the uniformity zone 112 has a diameter ranging from 1 μm to 3 μm, has a strong evanescent field of view and is easy to couple the light energy to the optical resonant cavity 120.

In one embodiment, the uniformity zone 112 has a diameter of 1 μm.

In one embodiment, an extension direction of the optical resonant cavity 120 is perpendicular to that of the uniformity zone 112. The extension direction of the optical resonant cavity 120 is perpendicular to that of the uniformity zone 112, so that a resonance effect of the optical resonant cavity 120 can be effectively improved.

In one embodiment, the micro-nanofiber 110 has cladding of air. That is, the micro-nanofiber 110 is wholly in the air. The air acts as the cladding of the micro-nanofiber 110, which improves the binding capability of the micro-nanofiber 110 to light, so as to effectively reduce the leakage loss of the micro-nanofiber 110 in a long-band fiber.

Figure 5:
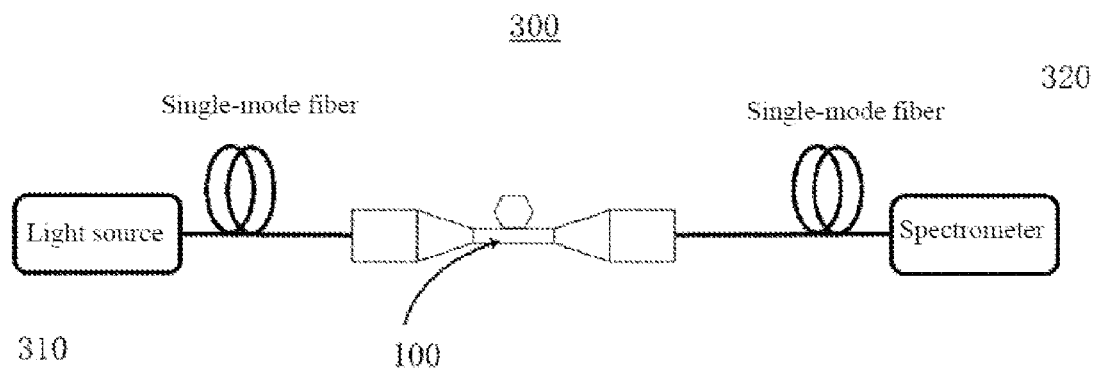
FIG. 5 is a schematic structural diagram of an all-optical detection system according to an embodiment of the present disclosure.

Referring to FIG. 5, an embodiment of the present disclosure provides an all-optical detection system 300, including the all-optical detector 100 as described above, a light source 310 and a spectrometer 320. The light source 310 is connected to a first end of the micro-nanofiber 110. The spectrometer 320 is connected to a second end of the micro-nanofiber 110. The light source 310 may be a supercontinuum laser light source. The light source 310 is configured to input a light to the all-optical detector 100. The light is transmitted into the micro-nanofiber 110, and the light satisfying a resonance condition resonates and is outputted through the optical resonant cavity 120. The spectrometer 320 is configured to receive an output light of the all-optical detector 100 and monitor a drift amount of a resonance peak of the output light. If to-be-detected light appears in the to-be-detected environment, the optical resonant cavity 120 of the all-optical detector 100 absorbs the to-be-detected light. A refractive index of the optical resonant cavity 120 is changed by the to-be-detected light, so that an optical path of the light propagated in the optical resonant cavity 120 is also changed, and then the resonance peak drifts. The to-be-detected light can be detected by monitoring the drift amount of the resonance peak of the output light by the spectrometer 320.

In this embodiment, the all-optical detection system 300 includes the all-optical detector 100. Firstly, the all-optical detector 100 detects light through changes in the resonance peak to realize all-optical detection, without converting optical signals into electrical signals for detection, so it is less affected by environmental factors and has a high signal-to-noise ratio. Therefore, the all-optical detection system 300 has a high signal-to-noise ratio. Secondly, the all-optical detector 100 realizes optical detection by changing the refractive index of the optical resonant cavity 120 with light. The all-optical detector 100 does not require the conversion of the optical signals and the electrical signals, so the response time is fast. Therefore, the response time of the all-optical detection system 300 is fast. Thirdly, the all-optical detector of the all-optical detection system 300 realizes optical detection based on the micro-nanofiber 110, so that the optical resonant cavity 120 is easy to be coupled with a single-mode fiber, thereby greatly reducing the connection loss. Fourthly, the all-optical detection system 300 according to the embodiment of the present disclosure is simple in structure and easy to implement.

Figure 6:
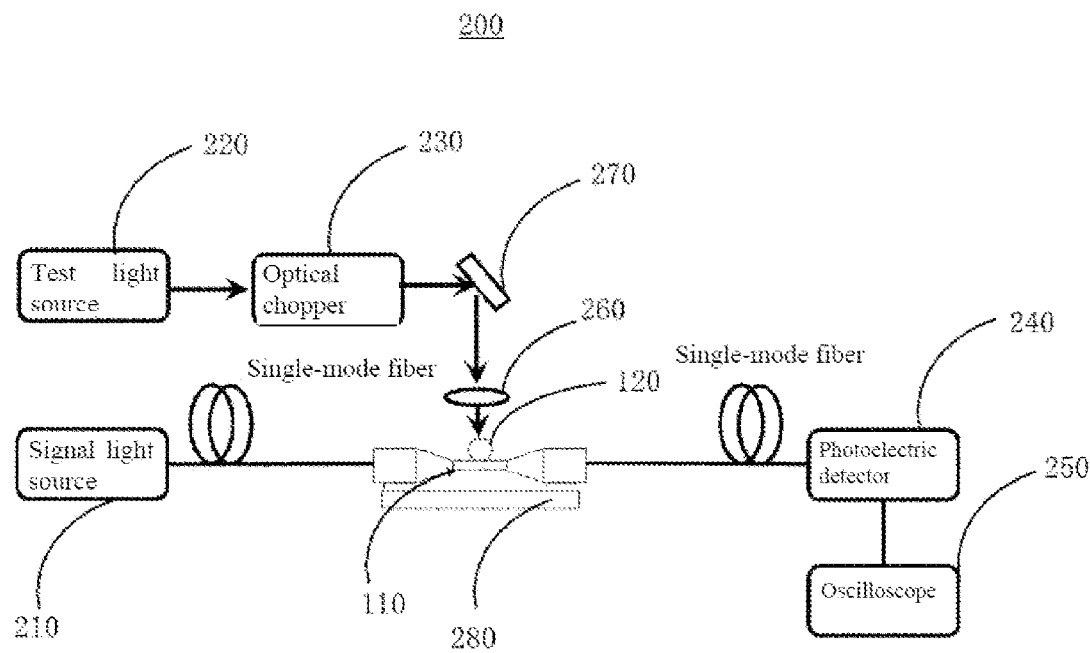
FIG. 6 is a schematic structural diagram of an all-optical detector response time test system according to an embodiment of the present disclosure.

The all-optical detector 100 according to the above embodiments has a relatively fast response time. Referring to FIG. 6, an embodiment of the present disclosure provides an all-optical detector response time test system 200, for testing a response time of the all-optical detector 100. The all-optical detector response time test system 200 includes a signal light source 210, a test light source 220, an optical chopper 230 and a photoelectric detector 240. Two ends of the micro-nanofiber 110 are defined as a first end and a second end respectively. The signal light source 210 is connected to the first end of the micro-nanofiber 110 and configured to input a signal light to the all-optical detector 100. The photoelectric detector 240 is connected to the second end of the all-optical detector 100 and configured to receive a light outputted by the optical resonant cavity 120. The photoelectric detector 240 converts a received optical signal into an electrical signal and output the electrical signal. The test light source 220 is configured to output a test light. The test light outputted by the test light source 220 is irradiated on a surface of the optical resonant cavity 120. The optical chopper 230 is arranged between the test light source 220 and the optical resonant cavity 120. The optical chopper 230 is configured to modulate the test light and output a pulse test light.

The signal light source 210 may be a laser. The signal light source 210 may be a supercontinuum laser light source or a fixed-wavelength laser. In one embodiment, the signal light source 210 is a tunable laser. The tunable laser can continuously change a laser output wavelength within a certain range, so that the all-optical detector 100 is tested more flexibly. The light outputted by the signal light source 210 includes light whose wavelength can satisfy a resonance condition. The signal light source 210 is connected to the first end of the micro-nanofiber 110 through a single-mode fiber. The test light source 220 may be a laser light source. A wavelength of the test light source 220 is determined according to a material of the optical resonant cavity 120. In one embodiment, the optical resonant cavity 120 is of a ZnO micron-wire structure, and the test light source 220 is an ultraviolet laser light source with a wavelength of 266 nm. The signal light source 210 generates a signal light and transmits an optical signal to the all-optical detector 100 through the single-mode fiber. The light satisfying the resonance condition in the signal light enters the optical resonant cavity 120 and resonates. The photoelectric detector 240 receives the optical signal outputted by the micro-nanofiber 110 and the optical resonant cavity 120 and converts the optical signal into an electrical signal. A resonance peak of a resonant wave outputted by the optical resonant cavity 120 is represented by a high level, and a non-resonance peak is represented by a low level.

The test light generated by the test light source 220 is continuous light. The test light passes through the optical chopper 230, and the optical chopper 230 modulates the test light, so that the test light is changed into a pulse light, and the light intensity undergoes a "decrease-increase-decrease" transformation. In this case, the optical chopper 230 is equivalent to switching "ON and OFF" of the test light. The test light modulated by the optical chopper 230 is named a pulse test light in the present disclosure. The photoelectric detector 240 receives the optical signal outputted by the micro-nanofiber 110 and the optical resonant cavity 120 and converts the optical signal into an electrical signal. High and low levels of the electrical signal outputted by the photoelectric detector 240 vary with appearance and disappearance of the resonance peak.

The response time of the all-optical detector can be obtained according to the time corresponding rising and falling edges of the high and low levels of the electrical signal outputted by the photoelectric detector 240.

In this embodiment, the conversion of the optical signal is represented by the electrical signal through the signal light source 210, the test light source 220, the optical chopper 230 and the photoelectric detector 240, so as to simply and intuitively test the response time of the all-optical detector 100. Appearance and disappearance of the to-be-detected light are simulated by the test light source 220 and the optical chopper 230, so that the test efficiency is high, simple and reliable.

In one embodiment, the all-optical detector response time test system 200 further includes an oscilloscope 250. The oscilloscope 250 is connected to an output terminal of the photoelectric detector 240. The oscilloscope 250 is configured to display an output waveform of the electrical signal. The response time of the all-optical detector 100 is more easily viewed and observed through the oscilloscope 250.

In one embodiment, the all-optical detector response time test system 200 further includes a focus lens 260. The focus lens 260 is arranged between the optical chopper 230 and the optical resonant cavity 120. Specifically, the focus lens 260 may be arranged vertically above the optical resonant cavity 120. The optical chopper 230 may be arranged above the focus lens 260. The test light source 220 may be arranged above the optical chopper 230. The test light generated by the test light source 220 passes through the optical chopper 230 and then is focused through the focusing lens 260, so that the optical resonant cavity 120 is easier to detect, thereby having a more obvious test effect on the response time of the detector.

In one embodiment, the all-optical detector response time test system 200 further includes a reflector 270. The reflector 270 is arranged along a vertical direction on one side of the focus lens 260 away from the optical resonant cavity 120. The test light source 220 and the optical chopper 230 are arranged along a horizontal direction on one side of the reflector 270. The reflector 270 is configured to change a direction of the pulse test light. Through the reflector 270, the test light source 220 and the optical chopper 230 can be arranged parallel to the all-optical detector 100, so that the setting and layout of the all-optical detector response time test system 200 are more flexible.

In one embodiment, the all-optical detector response time test system 200 further includes a support frame 280. The support frame 280 is of a U-shaped structure. The all-optical detector 100 is arranged on the support frame 280. Specifically, two ends of the micro-nanofiber 110 may be mounted on two ends of the support frame 280. The support frame 280 is configured to support the all-optical detector 100 and suspend the micro-nanofiber 110, so that the micro-nanofiber 110 is wholly in the air, and the air is used as cladding of the micro-nanofiber 110, so as to effectively reduce the discharge loss of the micro-nanofiber 110 in a long-wavelength optical wave.

Figure 7:
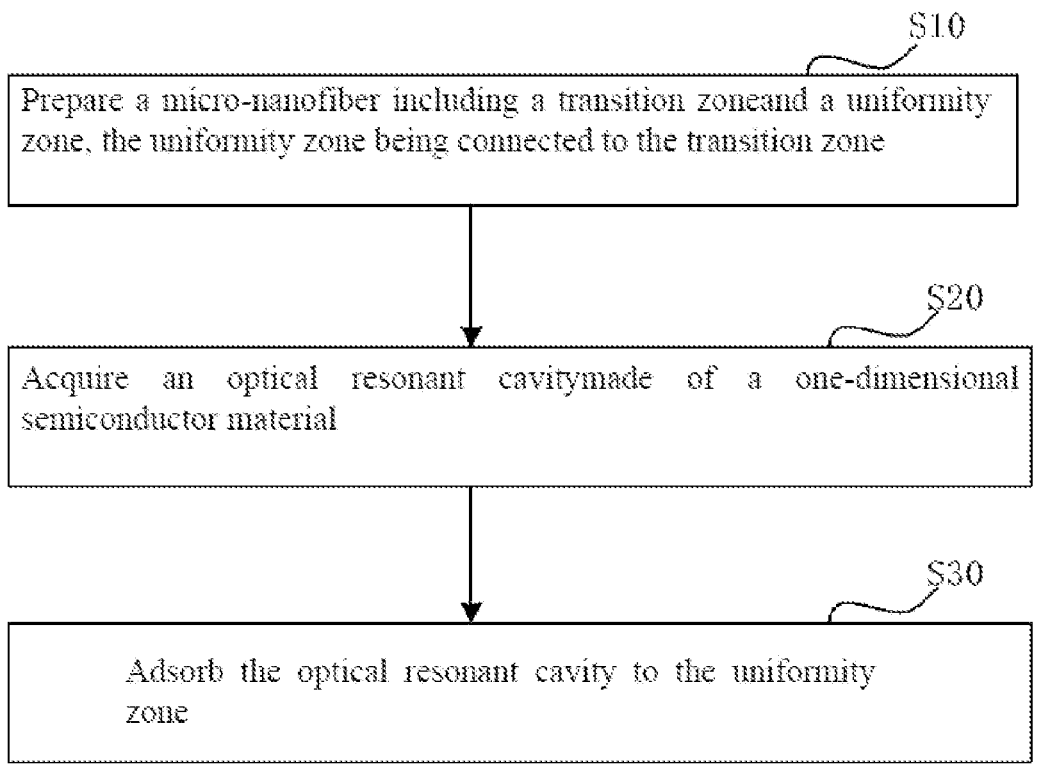
FIG. 7 is a schematic flowchart of a manufacturing method of an all-optical detector according to an embodiment of the present disclosure.

Referring to FIG. 7, an embodiment of the present disclosure provides a manufacturing method of an all-optical detector, for manufacturing the all-optical detector 100 according to the above embodiment. The method includes the following steps.

In S10, a micro-nanofiber 110 is prepared. The micro-nanofiber 110 includes a transition zone 111 and a uniformity zone 112. The uniformity zone 112 is connected to the transition zone 111.

The preparation method of the micro-nanofiber 110 is not specifically limited in the present application, and may be selected according to an actual requirement. A specific structure of the micro-nanofiber 110 is as described in the above embodiment and is not described in detail herein.

In S20, an optical resonant cavity 120 is acquired. The optical resonant cavity 120 is made of a one-dimensional semiconductor material.

A specific structure, a material, and so on of the optical resonant cavity 120 are described in the above embodiment.

In S30, the optical resonant cavity 120 is adsorbed to the uniformity zone 112.

The optical resonant cavity 120 may be adsorbed to the uniformity zone 112 in any manner, provided that the optical resonant cavity 120 and the uniform zone 112 can be bonded to form an integrated structure. The optical resonant cavity 120 is coupled with the micro-nanofiber 110 to form a WGM micro-nano composite structure.

In the manufacturing method of the all-optical detector according to this embodiment, the micro-nanofiber 110 is prepared, the optical resonant cavity 120 is acquired, and then the optical resonant cavity 120 is adsorbed to the uniformity zone 112, so as to obtain the all-optical detector 100. The manufacturing method of the all-optical detector according to this embodiment is simple in manufacturing process. Moreover, the all-optical detector 100 prepared based on the micro-nanofiber 110 is easy to be coupled with a single-mode fiber, thereby greatly reducing the connection loss.

Figure 8:
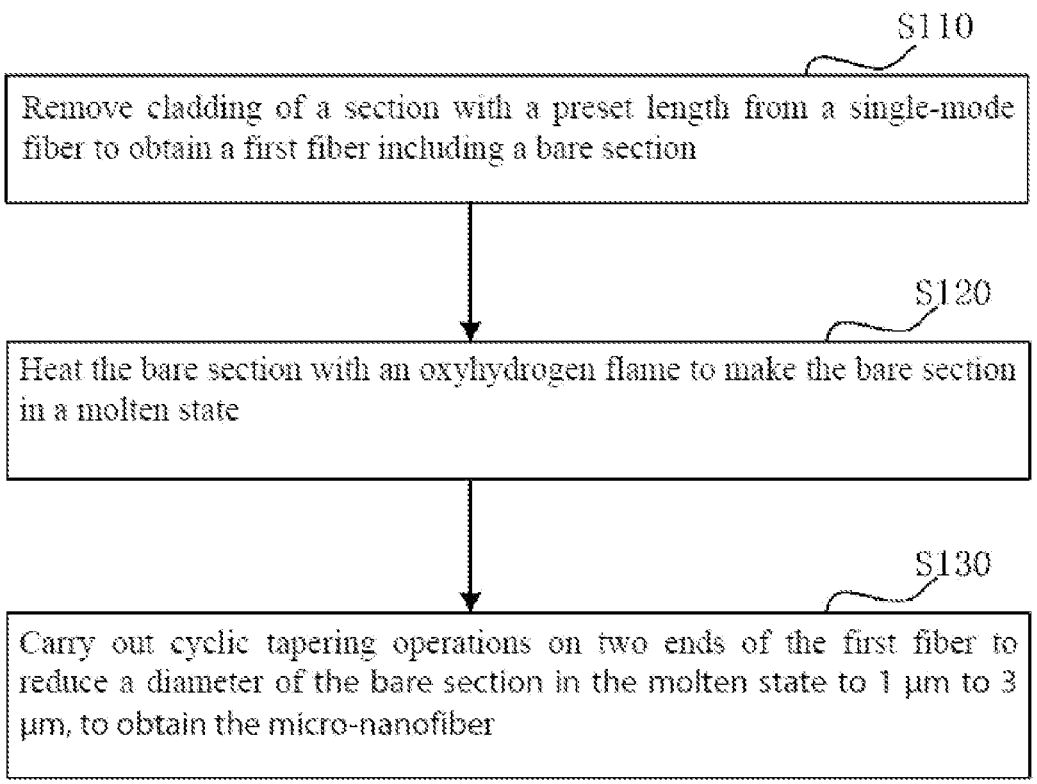
FIG. 8 is a schematic flowchart of a manufacturing method of an all-optical detector according to an embodiment of the present disclosure.

Referring to FIG. 8, in on embodiment, in S20, the step of preparing a micro-nanofiber 110 includes the following steps.

In S110, cladding of a section with a preset length is removed from a single-mode fiber to obtain a first fiber including a bare section.

The preset length may be set according to an actual requirement. In one embodiment, the preset length may be set to 5 cm. Cladding of a 5-cm section of the single-mode fiber is stripped so that the optical fiber in this section is exposed to form the bare section. The 5-cm bare section can avoid the combustion of the cladding by an oxyhydrogen flame in a tapering process. The fiber including the bare section is defined as a first fiber.

In S120, the bare section is heated with an oxyhydrogen flame to make the bare section in a molten state.

Two ends of the first fiber including the bare section are fixed to a fiber tapering machine. A point is selected from the bare section to be heated with the oxyhydrogen flame. For example, a midpoint of the bare section may be selected to be heated with the oxyhydrogen flame, so that the bare section enters a molten state.

In S130, cyclic tapering operations are carried out on two ends of the first fiber to reduce a diameter the bare section in the molten state to 1 μm to 3 μm, to obtain the micro-nanofiber 110.

Cyclic tapering operations are carried out on the first fiber by using the tapering machine. A diameter of the bare section in the molten state is gradually reduced under a tensile force. When the diameter of the bare section is reduced to 1 μm to 3 μm (which may be specifically selected according to an actual requirement), tapering is stopped, to obtain the micro-nanofiber 110. In this case, the bare section is the uniformity zone 112. During the tension, a section with a tapered structure, i.e. the transition zone 111, is formed at two ends of the bare section.

In this embodiment, cladding of a section with a preset length is removed from a single-mode fiber to obtain a first fiber including a bare section, the bare section is heated with an oxyhydrogen flame to make the bare section in a molten state, and cyclic tapering operations are carried out on two ends of the first fiber to reduce a diameter of the bare section in the molten state to 1 μm to 3 μm, so as to obtain the micro-nanofiber 110. The micro-nanofiber 110 prepared with the method according to this embodiment is simple, feasible, highly reproducible and controllable.

Figure 9:
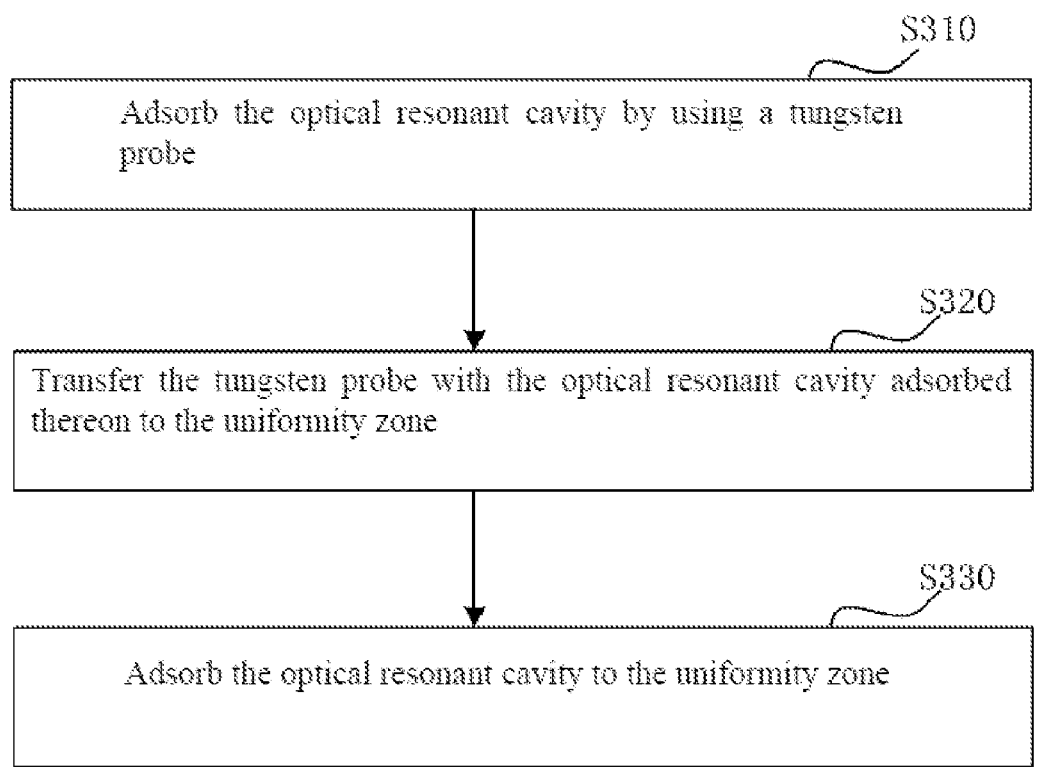
FIG. 9 is a schematic flowchart of a manufacturing method of an all-optical detector according to an embodiment of the present disclosure.

Referring to FIG. 9, in one embodiment, in S30, the step of adsorbing the optical resonant cavity 120 to the uniformity zone 112 includes the following steps.

In S310, the optical resonant cavity 120 is adsorbed by using a tungsten probe.

In S320, the tungsten probe with the optical resonant cavity 120 adsorbed thereon is transferred to the uniformity zone 112.

In S330, the optical resonant cavity 120 is affixed to the uniformity zone 112.

The optical resonant cavity 120 is adsorbed by the tungsten probe and transferred to the uniformity zone 112. Under the van der Waals force, the optical resonant cavity 120 is tightly adsorbed on the surface of the uniformity zone 112, thus forming the WGM micro-nano composite mechanism and producing the all-optical detector 100. The method according to this embodiment can simply and quickly realize the adsorption between the optical resonant cavity 120 and the uniformity zone 112. Moreover, the optical resonant cavity 120 is directly adsorbed with the micro-nanofiber 110, so that the coupling efficiency is high.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present disclosure, which are described specifically and in detail, and therefore cannot be construed as a limitation on the patent scope of the present disclosure. It should be pointed out that those of ordinary skill in the art may also make several changes and improvements without departing from the ideas of the present disclosure, all of which fall within the protection scope of the present disclosure. Therefore, the patent protection scope of the present disclosure shall be subject to the appended claims.

What is claimed is:

1. An all-optical detector, comprising:
    a micro-nanofiber comprising a transition zone and a uniformity zone, the uniformity zone being connected to the transition zone; and
    an optical resonant cavity arranged in the uniformity zone, the optical resonant cavity being made of a semiconductor material.

2. The all-optical detector according to claim 1, wherein the optical resonant cavity is made of a one-dimensional semiconductor material.

3. The all-optical detector according to claim 1, wherein the optical resonant cavity is of a ZnO micron-wire structure.

4. The all-optical detector according to claim 3, wherein the optical resonant cavity has a diameter ranging from 3 μm to 15 μm.

5. The all-optical detector according to claim 1, wherein an extension direction of the optical resonant cavity is perpendicular to that of the uniformity zone.

6. The all-optical detector according to claim 1, wherein the micro-nanofiber has cladding of air.

7. The all-optical detector according to claim 1, wherein the uniformity zone has a diameter ranging from 1 μm to 3 μm.

8. The all-optical detector according to claim 7, wherein the uniformity zone has a diameter of 1 μm.

9. An all-optical detection system, comprising:
    the all-optical detector according to claim 1;
    a light source connected to a first end of the micro-nanofiber and configured to input a light to the all-optical detector; and
    a spectrometer connected to a second end of the micro-nanofiber and configured to receive an output light of the all-optical detector and monitor a drift amount of a resonance peak of the output light.

10. An all-optical detector response time test system, for testing a response time of the all-optical detector according to claim 1, comprising:
    a signal light source connected to a first end of the micro-nanofiber and configured to input a signal light to the all-optical detector;
    a test light source configured to output a test light irradiated on the optical resonant cavity;
    an optical chopper arranged between the test light source and the optical resonant cavity and configured to modulate the test light and output a pulse test light; and
    a photoelectric detector with an input terminal connected to a second end of the micro-nanofiber and configured to receive a light outputted by the optical resonant cavity and convert an optical signal into an electrical signal.

11. The response time test system according to claim 10, further comprising:
    an oscilloscope connected to an output terminal of the photoelectric detector and configured to display an output waveform of the electrical signal.

12. The response time test system according to claim 10, further comprising:
    a focus lens arranged between the optical chopper and the optical resonant cavity and configured to focus the pulse test light.

13. The response time test system according to claim 12, further comprising:
    a reflector arranged along a vertical direction on one side of the focus lens away from the optical resonant cavity, the test light source and the optical chopper being arranged along a horizontal direction on one side of the reflector, and the reflector being configured to change a direction of the pulse test light.

14. The response time test system according to claim 10, wherein the signal light source is a tunable laser.

15. The response time test system according to claim 10, wherein the optical resonant cavity is of a ZnO micron-wire structure, and the test light source is an ultraviolet laser light source with a wavelength of 266 nm.

16. The response time test system according to claim 10, further comprising:
a support frame having a U-shaped structure, the all-optical detector being arranged on the support frame, and the support frame being configured to support the all-optical detector and suspend the micro-nanofiber.

17. A manufacturing method of an all-optical detector, comprising:
preparing a micro-nanofiber comprising a transition zone and a uniformity zone, the uniformity zone being connected to the transition zone;
acquiring an optical resonant cavity made of a one-dimensional semiconductor material; and
adsorbing the optical resonant cavity to the uniformity zone.

18. The method according to claim 17, wherein the preparing a micro-nanofiber comprises:
removing cladding of a section with a preset length from a single-mode fiber to obtain a first fiber comprising a bare section;
heating the bare section with an oxyhydrogen flame to make the bare section in a molten state; and
carrying out cyclic tapering operations on two ends of the first fiber to reduce a diameter of the bare section in the molten state to 1 μm to 3 μm, to obtain the micro-nanofiber.

19. The method according to claim 18, wherein the preset length is 5 cm.

20. The method according to claim 17, wherein the adsorbing the optical resonant cavity to the uniformity zone comprises:
adsorbing the optical resonant cavity by using a tungsten probe;
transferring the tungsten probe with the optical resonant cavity adsorbed thereon to the uniformity zone; and
affixing the optical resonant cavity to the uniformity zone.

* * * * *